United States Patent [19]

McLaughlin et al.

[11] 3,858,179

[45] Dec. 31, 1974

[54] ERROR DETECTION RECORDING TECHNIQUE

[75] Inventors: Donald W. McLaughlin, Bolingbrook; Panayote D. Makantassis, Chicago, both of Ill.

[73] Assignee: GTE Automatic Electric Laboratories Incorporated, Northlake, Ill.

[22] Filed: Apr. 2, 1973

[21] Appl. No.: 347,262

[52] U.S. Cl. ...... 340/146.1 R, 340/146.1 F, 360/53

[51] Int. Cl. ...................... G05b 23/02, H03k 13/32

[58] Field of Search ............. 179/7, 8; 340/146.1 R, 340/146.1 F, 174.1 B; 360/53

[56] References Cited

UNITED STATES PATENTS 3,725,880 4/1973 Sachs ...................... 340/174.1 B X

*Primary Examiner*—Malcolm A. Morrison
*Assistant Examiner*—R. Stephen Dildine, Jr.
*Attorney, Agent, or Firm*—Robert J. Black

[57] ABSTRACT

Traffic supervisory equipment for use in a telephone communication system adapted to record call switching data. Included is circuitry for detecting errors in the data recorded on an associated tape unit.

6 Claims, 2 Drawing Figures

PATENTED DEC 31 1974 3,858,179

SHEET 2 OF 2

ERROR DETECTION RECORDING TECHNIQUE

BACKGROUND OF THE INVENTION

1. Field of the Invention

This invention relates to traffic supervisory facilities for use in a telephone communication system and more particularly to a system for recording called switching data that includes circuitry for detecting errors in the data recorded on an associated tape unit, and provides a visual indication that an error is present.

Facilities that provide administrative engineering, maintenance and statistical information regarding the service and load conditions of a telephone office are becoming an ever important portion of modern telecommunication systems. In systems of this type certain pertinent data on the operation of the switching system is printed out and displayed at a maintenance control center. Additional information such as traffic data that is not required for on-line maintenance and management of the switching system and its network is usually outputted on computer compatible perforated paper and/or magnetic tape. This information is then in a convenient format for processing by a computer.

2. Description of the Prior Art

It has been quite common in telephone communication systems to provide at the telephone central offices traffic register equipment. This equipment usually consisting of traffic registers and counters (peg count meters, etc.) providing facilities for obtaining information about call busy attempts, group busy partial digits, traffic usage, position disconnect and answering time registration as well as other miscellaneous data on the various circuits in the office. This equipment usually mounted in relay racks provides individual indications relative to the associated circuits. Usually no recording of the figures on the various meters and counters was included, however, occasionally facilities for photographing the information was provided.

Included in more contemporary telecommunication systems are devices known as traffic usage recorders to provide traffic data by means of the switch count method. Test terminals of the circuits being studied are usually scanned at predetermined intervals and those found busy are recorded on registers for the various circuit groups with accumulated busies at the end of an hour or other predetermined period indicating the traffic load that was carried in terms of hundred call seconds. The test leads for circuits being measured are usually connected through contacts of scanning switches to output detector circuitry. The detector circuits are then connected through contacts of register switches and a register terminal grouping to registers assigned for the test leads. Associated with such traffic usage recorders may be a control panel which when equipped with appropriate optional equipment may serve several traffic recorder frames. It also permits operating personnel to operate the traffic recorder's equipment on automatic or manual basis at different times.

Included in the Crossbar Tandem System manufactured by Western Electric Company is a traffic usage recorder employed as a measuring facility to obtain traffic load information on trunks, links, senders and markers. Similar to the manner described above the traffic load is measured by making repeated scannings of the busy test terminals of the circuits under study. The quantities determined as busies are added accumulatively. Likewise similar equipment is provided with the Type 4 Switching Systems also manufactured by Western Electric Company.

The present invention constitutes an improvement in the call switching data recorder discussed in my copending application filed on Dec. 13, 1972, Ser. No. 314,891.

SUMMARY OF THE INVENTION

The present invention is drawn to a call switching data recorder and as such is included in those facilities that provide the necessary administrative, engineering, maintenance and statistical information regarding the service and load conditions of a tandem telephone switching office such as that designated No. 1 XPT as manufactured by GTE Automatic Electric Incorporated. Included in such equipment are keys, lamps and other devices to permit regulating the flow of traffic during periods of peak and excessive traffic loads. Normally the traffic recording and traffic management equipment described is located in a traffic or network administrative office or area. In a telephone system for which the present invention is intended call switching and similar pertinent data is transmitted to a data store buffer. In this location the data is stored while the markers continue normal operation. Once stored the data will be recorded on magnetic tape by an incremental tape recorder and later analyzed by computer. Due to the buffer storage technique, the system markers can go on to another call while data is being transferred from the buffer to the tape recorder and there is no increase in marker holding time. The selection of storage frequency and time length of recording intervals is under control of the associated traffic control console that is utilized in connection with the present invention.

In the communication system of which the present invention is a part each marker will signal that data is ready while it is releasing from the associated register sender and matrix. If appropriate conditions and controls are in a true or operable condition the data will be stored into the buffer parallely usually in a two-out-of-five code. At this time the following information is available on per call basis from each marker:

Four digits representative of the inlet identity (equipment location, the incoming trunk involved in the call).

The outlet identity consisting of four digits (giving the equipment location of the outgoing trunks selected for the call).

The called office and/or area codes in the form of three or six digits.

The marker identity consisting of one digit.

At the traffic control console associated with the present system equipment is provided that permits the following:

Selection of length and time of recording interval. Eight intervals are available, 15 minutes, 30 minutes, 1 hour, 2 hours, 4 hours, 8 hours, 12 hours and 24 hours. The recording time will begin only at the quarter hour as decoded from a real time clock.

Selection of rate of data storage. Three modes of storage rates are available. A continuous or maximum mode which records the data continuously as it occurs but is limited by some traffic level due to the speed of associated recording equipment. A one-out-of-10, and one-out-of-100 mode respectively to record every 10th or 100th call.

Initiation of recording at the next quarter hour. Recording continues for a selected time and automatically stops once the time is reached.

Operation to halt recording before the end of a selected recording interval has occurred. Stop time is recorded as the turnoff occurs.

Indication the tape unit is recording call switching data as calls occur through the switching system.

Indication that one or more trouble conditions such as broken tape, end of tape, loss of clock pulses, power failure, etc. are present. The data to be recorded on the tape includes 15 digits of call switching data for the marker along with 2 digits (10 and units) which give the count of calls processed by the markers since the last data was loaded. This count will be 10 and 100 in the one-out-of-10 and the one-out-of-100 modes respectively and will vary from one integer in the maximum mode.

Recording of stop and start times is loaded at the beginning and end of each tape data block. Also the time will appear at every 1 minute interval. Thus the actual calls processed by the marker for each minute are also recorded.

The local control panel provides for local control to supplement the normal remote controls included in the traffic control console referred to above. The local control panel functions as a maintenance aid by providing ready access and control to the switching system by virtue of its facility for being located at many points within the switching system where easy access to equipment is provided. This is facilitated by virtue of the present local control panel being mounted on a printed circuit card and connectable into standard connectors available throughout the frames and racks of the telephone switching system. The local control panel besides duplicating the normal controls provides for transfer control interlock to guard against dual controls being initiated at both the traffic control console and the local control panel.

As indicated previously the called switching data recorder records information about calls processed by the markers on a sample basis. This information includes various sampling rates (3) and intervals of time (8). The sampling rate is recorded with each data word and real time is also recorded with the data in minute intervals. The recording is done using a one word buffer to allow for extracting data from the markers without affecting them. The data is then being recorded on magnetic tape via an incremental tape recorder. The normal controls of the call switching data recorder as indicated are included in the traffic control console.

During normal operation of the call switching data recorder it is operated to prepare the tape unit for recording (load tape and manually achieve the ready mode using the controls on the tape unit). The mode is then selected and recording time intervals selected and the start switch depressed. The recorder permits only recording to begin at quarter hour intervals, so that at the next 15 minute mark the call switching data recorder will operate providing appropriate indication at the traffic control console and recording will begin. This will continue until the selected time has occurred. Clock pulses are counted and compared to the selected interval and when they agree, a stop sequence will be generated. The start switch is released after the "on" lamp comes on or else the call switching data recorder will again come on after the stop sequence. Any fault of course will cause the trouble lamp at the traffic control console to light and stop the recording. Operation of the interrupt switch will generate the stop sequence by generating a false selected time.

Included in the present system is circuitry to detect errors in the input data. Indications that errors have been detected is indicated on the tape output and a visual indication is also provided so that maintenance personnel are aware of the existence of data errors.

As a collector of data the present call switching data recorder may receive faulty data from its sources. These sources normally are considered the associated markers or trouble recorder. It is also possible that the call switching data recorder may generate its own faults. These faults may be associated with only some data words (i.e., marker 0 only) or only with certain characters (such as the fourth character or No. 2 bit).

It is considered desirable to record as much good data as possible rather than stopping all data storage if a fault is detected. However, the faulty data recorded should not be utilized as good data. Naturally the presence of faulty data should be known to operating personnel so that they may take appropriate action. In the present system all data is recorded but bad or faulty data is flagged to the magnetic tape unit, and by means of a visual indicator operating personnel are advised that a fault exists.

To provide detection of bad data, a two-out-of-five detector is used to detect bad two-out-of-five data as well as the detection of no-data on zero-out-of-five condition. It should be noted, however, that the zero-out-of-five data condition is valid for specific characters since only 30 digits may be seen in the translator (i.e., digits D, E and F are blank normally from the marker to the call switching data recorder). Errors detected are noted until the last character of the word is received. This end of word character is then altered to indicate to any data processing equipment reading the magnetic tape on which the information is recorded, that this word is not good, and contains faulty data. A latch is reset after the word is written on to the tape by the call switching data recorder. Thus the next word will not have an altered 18th character unless it too contains an error. In this manner only bad words are flagged and the words may be checked to see what is wrong since the information as stored on the tape is in the faulted mode.

Also included in the circuitry is a second latch which sets when any error is seen and must be manually reset. This latch is utilized to drive a visual indicator, and lets the call switching data recorder operator become aware that at least one error is on the tape and that a fault must be found. Since the tapes are normally removed from the recorder and processed elsewhere this provision hastens the fault isolation process. A second operation is made to alter the normal writing process if a zero-out-of-five condition is detected. In this situation a blank is written instead of the normal zero character.

DESCRIPTION OF THE PREFERRED EMBODIMENT

Figure 1:
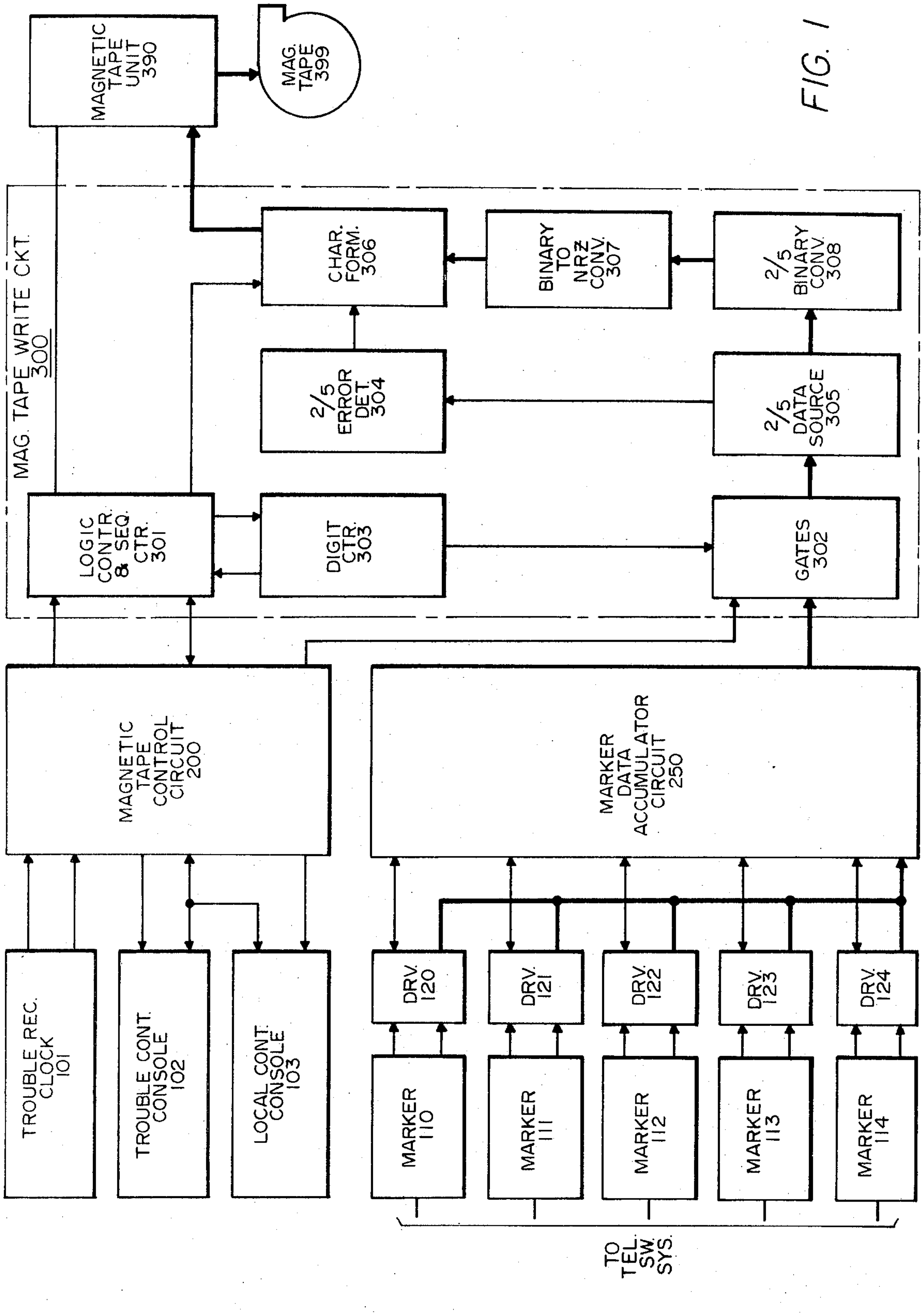
FIG. 1 is a block diagram of a call switching data recorder in accordance with the present invention.

Referring now to the circuit block diagram (FIG. 1) those circuits which provide connection to the call switching data recorder system, but do not form a portion of it include, the trouble recorder 101 (specifically the trouble recorder clock circuitry) the traffic control console 102 (which includes controls for the call switching data recorder) and the markers 110 to 114 included in the telecommunication system. Included as portions of the call switching data recorder are the local control panel 103 which provides local controls for the call switching data recorder, five traffic measurement access circuits 120 to 124 which provide the inlet facility to the call switching data recorder for information from the markers, a marker data accumulator 250, magnetic tape control circuitry 200, magnetic tape write circuitry 300 and the incremental magnetic tape unit 390 which in a preferred embodiment of the present invention consists of a unit (for recording on nine track magnetic tape 399) as manufactured by Cipher Data Products Model No. 100H, the output of which provides nine track coded information at an 800 bit per inch rate.

As shown in the block diagram data flow is indicated by heavier lines basic data information being derived from the markers through the traffic measurement access to the marker data accumulator 250 and transmitted from there to the magnetic tape write circuitry 300 where it is combined with information from the trouble recorder clock 101 which is taken through the magnetic tape control circuitry 200 with the ultimate information going through the magnetic tape write circuit to the incremental tape recorder 390.

The trouble recorder clock circuit 101 which does not form a portion of the present invention, provides signals periodically to be sent to the call switching data recorder in a two-out-of-five code on a parallel basis. The change signal is is also sent to disable decoding in the call switching data recorder during time changes. This signal is about 5 seconds long and occurs every minute. The clock circuitry operates on a 24 hour basis.

As noted previously the traffic control console is usually located in the traffic room separate from the switching equipment and the equipment of the call switching data recorder and contains controls for the call switching data recorder as previously described.

The five traffic measurement access circuits 120 to 124, each shown connected between an associated marker and the marker data accumulator 250 are provided on a one per marker basis and are mounted within the associated marker frame. These units provide the principal interface to the call switching data recorder and operate in response to a "data ready signal" from the associated marker and a "dump" signal from the call switching data recording equipment to permit the gating of the marker's call switching data to the marker data accumulator 250. Information is transmitted then from the traffic measurement access equipment by means of relay driver circuitry 120 to 124 on a parallel basis in two-out-of-five code.

The marker data accumulator circuitry 250 alloys for storage of the marker call switching data received via the data highway which is multiplied to each of the traffic measurement access circuits. The marker data accumulator includes: receiver circuitry connected to the markers, relay circuitry to receive the data storage latches, data ready counter circuitry, (a free running counter for pulse generation) and the buffer control logic.

The magnetic tape control circuitry 200 controls all the operations to be performed by the call switching data recorder. It includes clock pulse generating circuitry, a clock signal detector, time storage latches, start stop logic, a 15 minute timer and counter, tape control logic, and provides for buffering of the manual controls of the trouble control console as well as tape control logic.

The magnetic tape write circuitry 300 transfers data to the tape in binary code and consists of data steering gates 302, a digit counter 303, 2/5 data source 305, a two out of five binary code converter 308, binary to NRZ converter 307, the tape write logic control 301, the character formater 306 connected to the incremental magnetic tape unit 390. As noted previously, the tape unit is an incremental magnetic tape unit manufactured by Cipher Data Products and can write data on the order of a thousand characters per second. The unit includes a manual data entry feature for recording the data site location or other identifying information onto the beginning of each tape reel.

A better understanding of the present invention and particularly the operation of the call switching data recorder may be had from the following description of a typical 1 hour recording interval wherein reference is made to the block diagram of FIG. 1.

It should be noted, however, that the blocks referenced in the drawings are described in terms of their particular functional operation. The detailed circuitry in most cases may be implemented in several ways and as such does not form a portion of the present invention, unless the circuit details are presented.

Throughout the following description reference will be made to the operation of various latch circuits. The location of the principal latch circuits are as follows:

| LATCH NAME | LOCATION |
|---|---|
| START<br>LOAD TIME<br>TAPE BUSY<br>SHORT<br>TAPE DONE<br>HAVE LOADED TIME | MAGNETIC TAPE CONTROL CIRCUIT 200 |
| BUFFER BUSY<br>HAVE LOADED BUFFER | MARKER DATA ACCUMULATOR CIRCUIT 250 |
| WRITE A | TAPE WRITE CONTROL LOGIC 301 |
| DATA WORD ERROR<br>WRITE &/OR±<br>ERROR ANY WORD<br>NO DATA | CHARACTER FORMATER 306 |

Each of the latches is a similar logic circuit having two inputs (Set and Reset) and two outputs ("1" and "0"). Each latch operates and stays operated in the mode determined by the last received input signal.

Assume initially that all circuitry of the present invention is in its off and reset condition. The length of the recording interval will be selected (assume a 1 hour recording), and the mode of recording data is also selected (as shown the maximum mode). The start key is placed in the on position at 12:21. At 12:30 (the next 15 minute increment) as decoded from the clock circuitry of the trouble recorder 101, a start latch will be set. The 15 minute timer and counter in magnetic tape control circuit 200 (MTC) will be enabled, a load time latch will be set and recording may begin. Since the tape is idle, the start time (12:30) is recorded on the tape. In the meantime a tape busy latch will inhibit data from being loaded onto the tape until the "start time" is loaded. It should be noted however that data may be loaded into the buffer in marker data accumulator 250 (MDA) at this time. Once loaded a "tape done" latch will be set. On the next clock pulse the "load time" latch the tape busy latch and the tape done latch will be reset, the have loaded time latch sets to keep from continually storing the time and the tape unit 390 is available for data storage from the buffer since the "stop" condition is not true or present. The "have loaded time" latch will be reset when the clock advances off 12:30.

As soon as the marker completes a call and begins to release it will send a signal saying data is ready. This signal also advances the data ready counter in MDA 250. Since the maximum mode was selected and the buffer in MDA 250 is idle the buffer busy latch will be set to transfer the marker call switching data to the buffer along with the marker's identity. It is assumed for purposes of description that marker 112 will be the reporting marker.

A data ready count (a count of one since this is the first call of recording sequence), is also stored in the buffer in MDA 250 and then the counter in MDA 250 will be reset. The "buffer busy" latch will keep other markers from storing data while this data is being recorded on the tape 399. The tape unit 390 is idle so now a tape busy condition will be set and the data stored in the buffer will be recorded serially by digit onto the tape. When recording is completed a "tape done" latch will be set and the buffer in MDA 250 will be reset along with the tape busy latch. The tape unit and the data buffer again are in their idle conditions.

Note that if while the data from marker 112 was being stored on the tape, another marker (for example marker 111) had sent a data ready signal, it would increment the the counter in MDA 250 to "one" but no data would be loaded. Now when data is again ready say from marker 113, the counter would be advanced to two and this data would be stored since the buffer was reset after marker 111's data was stored on the tape. The count of "two" would also be stored in the buffer indicating this is the second call since the last data storage. The marker identity of marker 113 is also stored in the buffer. Thus data is continuously stored in this way; those calls occurring while the buffer is busy are recorded by the counter so that figure for the total calls processed and relative occurrence rate are available with the actual call switching data and associated marker identity.

At 12:31 the 1 minute timing will set the "load time" latch as in the start operation, but the 15 minute counter in MTC 200 is not advanced since the 15 minute mark is not present. This time is stored on the tape as before. This 1 minute condition will occur every minute from 12:32 through 12:44. At 12:45 15 minutes of recording have elapsed and the 15 minute time is loaded using the load time latch as before. The 15 minute counter was advanced to a count of one indicating the elapsed recording time. The counter time does not equal the selected time which would be a count of four, for 60 minutes for the present example. When the tape unit 390 next becomes idle, the 15 minute time (12:45) is loaded onto the tape while tape busy setting keeps the buffer waiting if it is also loaded again. Once the time (12:45) is loaded, tape busy will be reset along with the other latches if the tape unit is available for data storage from the buffer. At 1:00 and 1:15 the counter in MTC 200 will advance to 2 and 3 respectively. The time will also be loaded every minute. At 1:30 the counter is advanced to 4 and now the selected time and counter agree so the stop latch will be set which will set the load time latch. If the tape is busy that data will be loaded completely but the buffer can no longer be loaded by any marker since the stop signal is present. When the tape unit 390 is idle the tape busy latch will be set and the stop time (1:30) will be loaded onto the tape. The tape done latch will then be set and everything will be reset. The entire system will then return to idle.

Operation for use in the one-out-of 10 mode and the one-out-of-100 mode is the same except that the call ready counter must be at the 10 or 100 counts respectively before the buffer is stored with the marker's data. In these modes the case of no data being stored because the buffer is busy would never occur.

In a magnetic tape control circuitry 200 logical operation will be described in the following. For the turn on operation, the first 1 minute mark (with the counter still at zero count), the 15 minute mark and the turn off operation.

Once the tape unit 390 is prepared to receive data and the desired length of the recording interval and mode are selected at the traffic control console 102 the start switch will be operated to its on position. The start signal will go to its true condition but it should be assumed that we are not at this time decoding a particular 15 minute time. For example it may be at 1 minute to the hour. The trouble recorder clock 101 will send the change signal as it changes the time by 1 minute. The change latch will be set and the time latch reset disabling the 15 minute pulse decode. After about 5 seconds change the change signal will go away but since the trouble recorder decode is still not clear the timer in MTC 200 will be enabled as a result of the change latch resetting. An "L signal" will be submitted which indicates the timer is running. As the timer finishes a "P pulse" will be given and the L pulse stopped. A time latch will be set from the P signal along with the loading of the trouble recorder signals into the time latches in MTC 200 (the load time signals LTSP and LTRP).

Since the time is on the hour the 15 minute pulse will come true. This will set the start latch which enables the time counter in MTC 200 and the data ready counter in MDA 250. The load time latch will now set, in turn setting the short latch and tape busy latch. This condition will place a demand on the tape unit 390 to load the four time characters stored in the time latches. Once this is complete via the magnetic tape write operation, the tape done latch will set in turn resetting the load time latch, the short latch, the tape busy latch, tape done latch, digit counter and set the have loaded time latch. When a change again occurs the operation to load the new time will be the same as before resulting in 1 minute after the hour being stored. This will cause the 15 minute pulse to be removed and the have loaded time latch will reset. It should be noted that once the start latch sets as evidenced at the traffic control console by an on lamp indication, the start toggle switch may be turned off.

On the occasion of the first 1 minute mark no action occurs in the magnetic tape control circuit 200 unless the change signal comes true from the trouble recorder clock 101 (except the tape busy and the tape done latches due to the marker data accumulator operation). With the occurrence of the change signal disappearing the time latch will be set with the timer "P signal" along with the storage of the trouble recorder time onto the time latch.

The load time latch, short latch and tape busy latch will now set and the time will be loaded via the magnetic tape write circuit 300 operation. Once the magnetic tape write operation is completed the tape done latch will set. This in turn resets the load time latch, short latch, tape busy latch, tape done latch and digit counter and sets the have loaded time latch. The have loaded time latch is then reset with the resetting of the time latch during the next time change.

The 15th change signal results in the time being loaded as before but now the decoded time is such that the 15th minute pulse occurs. This advances the time counter in MTC 200 from the zero count (no advance when start is set since the counter is not enabled yet) to the one count. Assume we have selected a 4 hour recording interval so the selected time occurred signal (STO) does not come true. Again the latches are set as previously described followed by the tape done sequence. The counter in MTC 200 will advance every 15 minutes for the two through nine counts and those respective times will be loaded onto the tape 399 due to the magnetic tape write circuit 300 operation to be described below. However, when the count of nine occurred the carry latch was also set. Now when the next 15 minute pulse occurs the counter tens and units latches are advanced to give a count of 10. This decode resets the carry latch so only the units latch will be advanced on the next pulse. Again the time is stored on the tape.

As the 16th 15 minute pulse occurs the counter in MTC 200 will advance to a count of 16 and set the load time latches before. Now since we are in a 4 hour recording interval, the selected time occurred signal (STO) will come true. This will reset the start latch. The time counter enabling signal will be removed and the reset occurs along with the reset to remove the enable signal to the data ready counter in MDA 250. The marker data accumulator circuit 250 is also disabled since the load data signal is also disabled. The count will not be zero and the stop time will be loaded via the magnetic tape write circuit 300 operation as before. When this is completed the tape done latch will cause the reset operation as before and the call switching data recorder will return to its off condition. The off condition is evidenced by the on lamp at the trouble control console being extinguished. With the next change signal the "have loaded" time latch will be reset. Note that if the start toggle switch has not been placed in the off condition another 4 hour recording interval will begin.

The logical operation of the marker data accumulator circuitry 250 will be described for the following situations:

Missed storing of data from marker 110 since the call switching data recorder is off while storing data from marker 114 and missed storing of data from marker 110 since the buffer is busy due to marker 114's data. The mode will be maximum. The second case will be that of storage of data from marker 110 and the data ready counter going from nine to ten with the missing of storing data from marker 114 and then 110. Since the data ready counter is now at ten the mode will be that of one in 10. The final case will be recording of data from marker 114 while recording (the stop latches set), but after the data stored signal comes true and missing the storing of data from marker 110 since the call switching data recorder is at its off condition. This latter case will involve operaton in the maximum mode.

In the first case the data ready signal will be generated in marker 110. This will set the data ready latch associated with marker 110. On the next P1 pulse the advance count signal will be set to the data ready counter in MDA 250. Since the call switching data recorder is off the counter will not advance and will remain in its reset state. The dump signal does not occur since the load data signal is inhibited until the call switching data recorder is turned on. Since no data is loaded a set buffer busy pulse will also be blocked. On the first P1 pulse after marker 0 removes the data ready signal its data ready latch will be reset. The call switching data recorder will now be on due to the magnetic tape control circuitry 200 operation.

The data ready signal occurs from marker 114 and on the first P13 pulse its data ready latch will be set. This will generate the advance count pulse which steps the data ready counter in MDA 250 from zero to one indicating a call has occurred since the recorder was on. The P14 pulse will generate the dump signal to marker 114. Since the load data signal is true and we are in the maximum mode the dump signal starts the counter and locks the pulse counter on the P14 pulse to permit the data relays 124 to operate. Once the delay counter reaches a count of three, a slow clock pulse A and a fast clock pulse B occur together and the delay latch will be set. This permits the pulse counter to advance on the next pulse and generates the storage enable pulses to store the call switching data from marker 114 into the buffer data latches in MDA 250. The data ready count of one is also stored in the buffer data latches. The pulse counter advancing off a pulse count of 14 will turn off the dump signal. The 15th pulse and the data storage signal generate the buffer busy signal which will set the buffer busy latch and reset the data ready counter in MDA 250. The buffer busy signal will set the tape busy latch which will send a demand to load the data to the magnetic tape write circuit 300.

Once the data is loaded the tape done latch will be set which will cause the tape busy, the tape done and the digit counter to reset while the have loaded buffer latch will set. This will generate the storage reset pulses to reset the buffer until the data stored signal goes away. Then on the 16th pulse the buffer busy and have loaded buffer latches will reset. It should be noted that the data ready signal for marker 110 occurring while marker 114's data was being loaded, advanced the data ready counter in MDA 250 from zero to one so when the next data is stored a count of two will be recorded.

In the second case, the recording mode is that of one in 10, meaning every 10th code is to be recorded. The counter 253 in MDA 250 has been advanced to the count of nine which says that nine calls have been processed by the marker since either the last data word was recorded or the call switching data recorder was turned on. Now marker 110 sends the data ready signal and sets its data ready latch when a P1 pulse occurs. This advances the counter to 10 and the load data signal is enabled. The carry latch is reset on the next A pulse and set with the count of nine. The P2 pulse generates the dump signal to marker 110, locks the pulse counter, and starts the delay counter. After the delay occurs the latch is set and the pulse counter enabled. The data from marker 110 is stored in the data latches in MDA 250 with the count of 10 from the data ready counter.

The dump signal is now removed and the data storage signal will come true to allow the set buffer busy signal on the next P3 pulse. The buffer busy latch was set and set the tape busy latch. Note that the delay counter was reset by advancing to the zero count. After the magnetic tape write operation to be described below, the tape done latch will set and everything is reset as in the previous case.

Some time later the marker 114 followed by marker 110 data ready signals occur setting their respective latches. Each operation generates the advance count signal to step the data ready counter in MDA 250 from zero to one and then up to two but the load data signal is blocked since the unit's count of zero is false. The data stored signal being present keeps the buffer busy latch from setting. Operation of the one-out of-100 mode is similar to that outlined above.

In the final case referred to above the maximum mode is employed. Marker 114 will send a data ready signal and the usual storing of this data into the latches in MDA 250, occurs with the exception of the magnetic tape control circuit 200 operation, to reset the start latch just after data was stored in the buffer. If this occurred before the load data signal had allowed the delay latch to set, no data would be stored and the buffer busy latch would not set. Also the buffer busy latch, set the tape busy latch before the load time latch set so the magnetic tape write circuit 300 will handle this demand first. This race for the tape unit could occur whenever the load time latch sets except for the call switching data recorder "on" operation. In case of a tie the load time latch overrides the buffer busy latch since the short latch is allowed to set. This is done so that the 15 minute times will be written as soon as the next demand for the magnetic tape write circuit 300 is available. Going back to the present case, once the tape busy latch is reset due to the tape done operation, it is set again to load the stop time. When the data signal occurs for marker 110 no advance occurs since the counter is disabled by the stop latch (start not). Once the stop time was loaded the call switching data recorder is off.

The logical operation of the magnetic tape write circuit 300 will be described in connection with two cases. The first of these are a short load cycle. This loads the four time characters followed by an inter-record gap for the start time, all minute marks and the stop time. The other case will be a long load cycle. This loads the seventeen characters stored in the marker data accumulator buffer followed by an "AND" character (one call switching data word).

In the first case of a short load cycle, the tape done signal along with the short signal defines the short load cycle and results whenever the load time latch sets. The run signal indicates proper conditioning of the tape unit. Failure to have the run signal while the call switching data recorder is on lights the trouble lamp on the trouble control console panel. The digit counter 303 is at zero so the enable circuit comes true to allow advancing of the digit counter and enables the go signal. Assuming now that there is not a broken tape or gap in progress or busy mark in the tape unit. The go signal will enable the sequence counter which steps to a count of one, two and three. This advances the digit counter 303 to a count of one, loads the non-return to zero data latches and sends the step-write signal to the tape unit 390, respectively. The digit count of one along with the short signal gates the hours and 10 time latches through the steering gates 302 in a two out of five code, to the binary conversion logic 308. This converts each digit to nine track IBM code and enables the four NRZ data latches which were allowed to change on the sequence counter count of two. The step-write signal to the tape unit 390 permits the data present on the eight data leads to be written onto the tape 399. The busy signal indicates that the tape unit is performing this function and its removal indicates it is done. Normally the go signal will come true before the next slow pulse "A" and the four time digits will be loaded 1.36 milliseconds apart. The count of five occurs when the sequence counter reaches a count of two the fifth time and disables the EN(B) signal and enables the short load done signal. The NRZ latches are reset since no data is gated through the steering gates 302 and the step-write signal is disabled while the inter-record gap signal is sent to the tape unit. The gap is written and is indicated by the gap in progress signal. The SLD signal sets the tape done latch and the reset occurs to ready the magnetic tape write circuitry 300 for the next request.

In the other case of a long load cycle, the tape done signal with a long signal (short not) defines the long load cycle and results whenever the buffer busy latch sets. The EN(A) signal enables the digit counter as it goes from zero to nine and the first nine characters of call switching data are written on the tape 399 as in the short mode cycle. At the count of nine the EN(A) signal is disabled and the EN(C) latch sets the digit counter 303 to step up to a count of 18 and the rest of the call switching data to be loaded onto the tape. The count of 18 resets the EN(C) latch and no data is loaded into the NRZ latches via the steering gates 302. The write AND latch sets on sequence counter count of two and an AND character is written onto the tape. The 18 count also enables the long load done signal to begin the reset signal by setting the tape done latch in the magnetic tape control circuit 200. Any of the enable signals EN(A), EN(B), or EN(C) allow the first four data lines to the tape unit to be enabled so that nine track IBM binary code is followed. The sequence counter is reset by allowing it to set to zero.

Figure 2:
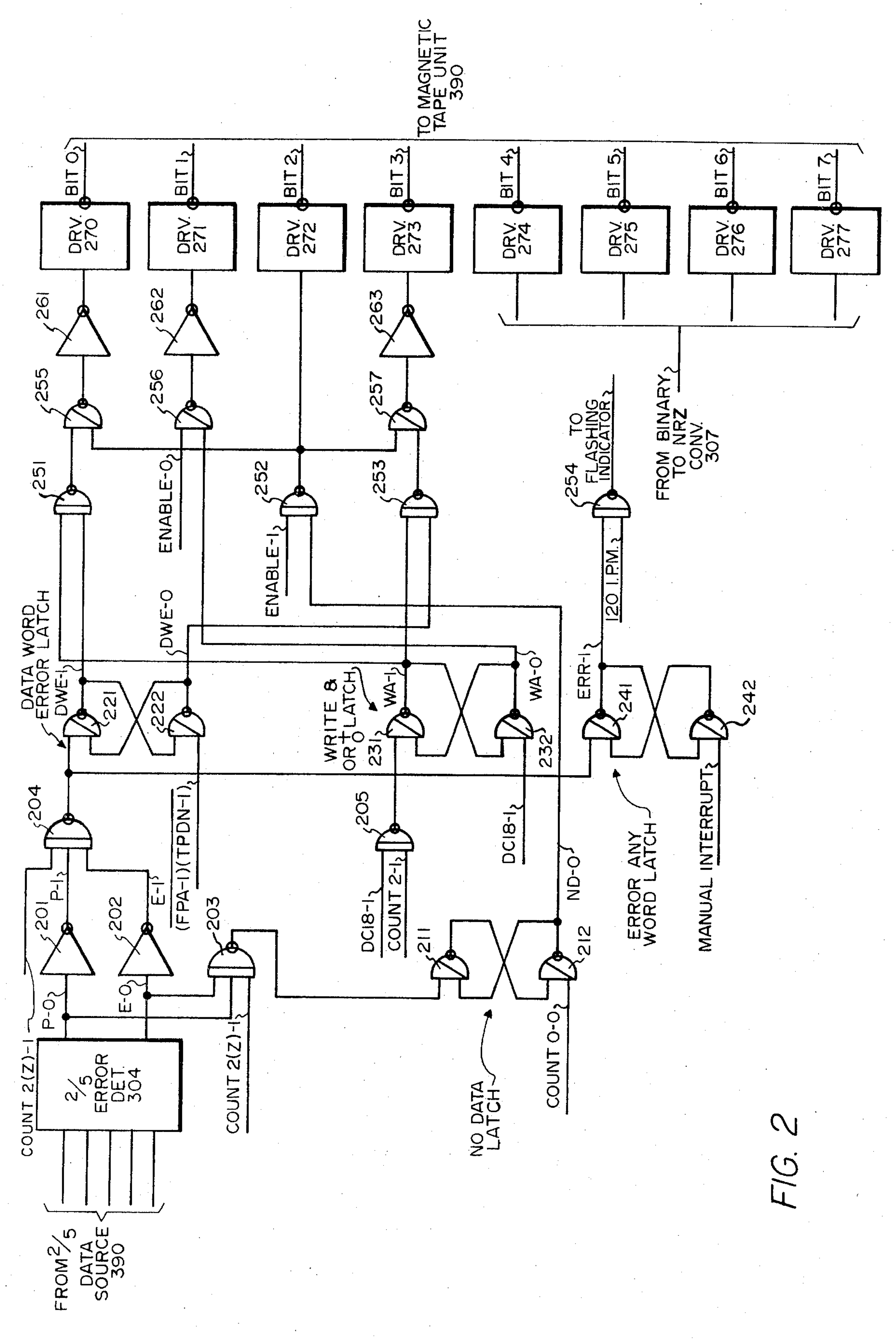
FIG. 2 is a logic diagram of the character formater employed in the present invention.

As noted previously one of the important features of the present system is the inclusion of circuitry to detect errors in incoming data and provide indications on the tape output that such data errors exist. Referring now to FIGS. 1 and 2 data stored in the marker data accumulator circuit 250 is serially fed to the magnetic tape unit 390 by steering gates 302 which are controlled by digit counter 303. Each count of digit counter 303 enables a different character through the steering gates 302. This output which is in a two-out-of-five code is multiplied in two-out-of-five data source 305 and conducted to two-out-of-five to binary converter 308. From two-out-of-five binary converter 308 binary information is transferred to binary to NRZ (non-return to 0) code for conduction through the character formator 306 to magnetic tape unit 390. The entire process is controlled by the magnetic tape write control logic 301. An eighteenth character is also created to give an end of word mark. The character formater 306 which is shown in detail in FIG. 2 is logic circuitry which converts the 4-bit NRZ data to eight track IBM code. For numeric characters bits 0-3 are all one's.

Referring now to FIG. 2 the operation of the character formater 306 and the error detector 304 will be discussed. Shown in FIG. 2 are the error detector 304 which may assume any well known form. Sole criteria being the indication of appropriate outputs for acceptable code signals and non-acceptable signals for those containing an error in the received information. The remaining circuitry shown in FIG. 2 is that of the character formater 306 but includes the data word error latch, the write &/or + latch, the no-data latch and the error-any-word-latch. Also shown are drivers 270–277 which provide output signals from the character formater 306 to the magnetic tape unit 390 at appropriate drive levels for use by the magnetic tape unit 390. The detail circuitry of the drivers may be conventional, the only requirement being that output signals from the character formater internal circuitry and from binary to NRZ converter 307 be inverted and changed to appropriate signal levels for use by the magnetic tape unit.

The data word error latch consists of NOR gates 221 and 222, the write &/or + latch includes NOR gates 231 and 232, the no-data latch consists of NOR gates 211 and 212 and the error-any-word latch includes NOR gates 241 and 242. Also included in the character formater are NAND gates 203, 204, 251, 252, 253 and 254 NOR gates 255, 256 and 257 and inverters 201, 202, 261, 262 and 263.

Signals required for operation of the character formater include enable-1 and enable-0 which are derived from logic control circuit 301, pulse DC-18-1 from digit counter 303 and count 0–0, count 2(Z)–1 and count 2–1 which are derived from the sequence counter portion of 301. Inputs to drivers 274–277 inclusive are taken from binary to NRZ converter 307. Inputs to the error detector are taken from the two-out-of-five data source 305 while output from the character formater are directed to the magnetic tape unit 390. Signal (FPA-1) (TPDN-1) is derived from the magnetic tape control circuit 200 and indicates that this word has been stored on the tape.

Three conditions of operation will be discussed in connection with the operation of the error detector and character formator. These are normal operation, operation with an error detected and operation with a blank character. Normally all characters are numerics and the eight track code utilized by the magnetic tape unit 390 requires that the 0, 1, 2 and 3 bits shall all be ones. The enable 1 and the enable 0 signals from the logic control portion of 301 applied to gates 252 and 256 respectively force this condition. The 4, 5, 6 and 7 bits are driven from the output of the binary to NRZ converter 307. An eight for example is 1111 1000. The enable signal is forced from counts 1–17 of the digit counter 303. The eighteenth character is an & which is symbolized by the code 0101 0000. The latches included in the binary to NRZ converter 307 will have no data in them so bits 4–7 inclusive are zeros. The write & latch consisting of NOR gates 231 and 232 controls bits 0–3 inclusive. Since in the first situation with no error present the data word error latch consisting of NOR gate 221 and 222 is reset, the 0 bit will be "off" and the 4 bit will be "on". The 1 bit is always on for an 18th character since the data word error signal is not used and the 2 bit is always off since a WA output is not used. Thus a 0101 0000 is written as the last character. If an error is detected by error detector 304 the data word error latch will be set. The setting of the latch due to operation of gate 204 which operates in response to a count 2(Z)-1 in combination with a P1 pulse from inverter 201 and an E1 pulse from inverter 202. This signal indicates that data was present but that it was not in a valid two-out-of-five code form. This data will then be sent through the binary and NRZ converters and written on to the tape. It should be noted that this error could only effect the 4–7 bits. The error latch consisting of NOR gates 241 and 242 is also set from the output of NAND gate 204. When the eighteenth character is written the 0 bit will be on and the 3 bit off so that + will be written as represented by 1100 0000. The write & latch is reset after the 18th count is removed and the data word error latch is also reset. The error any word latch consisting of NOR gates 241 and 242 will remain set until manually reset by application of a pulse to the manual interrupt lead extending to NOR gate 242. As long as the error any word latch is in its set condition its output coupled with 120 IPM signals applied to NAND gate 254 will cause operation of a flashing indicator connected to the output of NAND gate 254. The operation of the flashing lamp at 120 IPM indicates that at least one two-out-of-five error has been detected.

If for any character, no data is seen by the two-out-of-five error detector 304 when data is stable and a valid two-out-of-five code is not present; the no data latch consisting of NOR gates 211 and 212 will operate in response to PO and EO signals from the two-out-of-five error detector 304 coupled along with a count 2(Z)-1 signal from the sequence counter 301 to operate NAND gate 203 which will set the no data latch. The no data 0 signal is then anded with an enable-1 signal from the logic control portion of 301 by NAND gate 252 to drive the 0, 2 and 3 bits. These will then be forced off so a blank will be written as represented by 0100 0000 instead of a true 0 represented by 1111 0000. In this manner "no data" signals are distinct from that of representations of true zeros for proper analysis by a central processor. The no data latch is reset once this character has been recorded by the magnetic tape unit in response to a sequence count of count 0–0.

It is also important that the 1 bit is controlled by signals enable-0 and WA-0 "or"ed together instead of wiring in the 1 bit at gate 271 with a ground. The 1 bit should always be true but failure to see this also indicates an error in the character formater logic 306.

While but a single embodiment of the present invention has been described, it will be obvious to those skilled in the art that numerous modifications of the present invention can be made without departing from the spirit and scope of the invention, which is limited only by the claims appended hereto.

What I claim is:

1. For use in a telephone system data recording subsystem wherein coded characters representative of call switching data are transmitted from telephone switching equipment to data recording means, a data error detector comprising:

a code error detector connected to a source of coded data, operated in response to detection of an error in the coding of said data, an output circuit connected to said data recording means, including a plurality of signal drivers, each connected to said recording means, and a plurality of latch circuits connected between said error detector and a portion of said signal drivers, initially operated in response to the conduction of error free coded data to said error detector, to operate said portion of signal drivers to transmit a first plurality of predetermined signals to said recording means, said plurality of signals forming a portion of the coded data recorded by said recording means.

2. A data error detector as claimed in claim 1 wherein there is included:

a first one of said plurality of latches operated in response to completion of transmission of a predetermined number of coded characters from said telephone switching equipment to said recording means, to further operate said portion of signal drivers, to transmit a second plurality of predetermined signals to said recording means to indicate the lack of error in said transmitted coded characters recorded by said recording means; said recording means operated in response to said second plurality of signals, to record said second plurality of signals.

3. A data error detector as claimed in claim 2 wherein there is included:

a second one of said plurality of latches operated in response to operation of said code error detector, detecting an error in the coding of said data; operation of said first and second ones of said latches in combination, effective to further operate said portion of said signal drivers to transmit a third plurality of signals to said recording means to indicate an error in said transmitted coded characters recorded by said recording means; said recording means operated in response to said third plurality of signals to record said third plurality of signals.

4. A data error detector as claimed in claim 3 wherein there is included:

a third one of said plurality of latches operated in response to operation of said code error detector, detecting an error in the coding of said data, to provide a visual indication of said error detection.

5. A data error detector as claimed in claim 4 wherein there is included: means for manually terminating said visual indication.

6. A data error detector as claimed in claim 4 wherein:

said code error detector is further operated in response to the absence of coded data; and there is further included a fourth one of said plurality of latches operated in response to said further operation of said code error detector in response to the absence of coded data, to further operate said portion of said signal drivers to transmit a fourth plurality of signals to said recording means to indicate the absence of coded data; said recording means operated in response to said fourth plurality of signals to record said fourth plurality of signals.

* * * * *